(12) United States Patent
Cox et al.

(10) Patent No.: US 6,574,321 B1
(45) Date of Patent: *Jun. 3, 2003

(54) APPARATUS AND METHOD FOR MANAGEMENT OF POLICIES ON THE USAGE OF TELECOMMUNICATIONS SERVICES

(75) Inventors: Neil B. Cox, Burnaby (CA); Cameron Young, Pitt Meadows (CA)

(73) Assignee: Sentry Telecom Systems Inc., Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,446

(22) Filed: Apr. 2, 1999

Related U.S. Application Data (63) Continuation-in-part of application No. 08/848,431, filed on May 8, 1997, now Pat. No. 5,949,864.

(51) Int. Cl.[7] ................................................. H04M 1/06
(52) U.S. Cl. .................. 379/189; 379/196; 379/201.01; 379/220.01; 379/243; 379/386
(58) Field of Search ............................ 379/188, 189, 379/196, 197, 198, 199, 200, 219, 220.01, 221.01, 242, 243, 283, 377, 386

(56) References Cited

U.S. PATENT DOCUMENTS

| | | |
|---|---|---|
| 4,720,862 A | 1/1988 | Nakata et al. |
| 4,809,272 A | 2/1989 | Torgrim et al. |
| 4,811,378 A | 3/1989 | Else et al. |

(List continued on next page.)

OTHER PUBLICATIONS

Law, Randall A. et al.,"*Real–Time Multi–Channel Monitoring of Communications on a TI Span*", Proceedings of the May 9–10, 1991 IEEE Pacific Rim Conference on Communications, Computers and Signal Processing, pp. 306–309. U.S. application Ser. No. 08/848,431 filing date May 8, 1997. Fraud Prevention Apparatus and Method for Performing Policing Functions for Telephone Services Inventor: Neil B. Cox, Assignee: Sentry Telecom Systems.

*Primary Examiner*—Creighton Smith
(74) *Attorney, Agent, or Firm*—Oyen Wiggs Green & Mutala (57) ABSTRACT

This invention allows enterprises to achieve specific objectives in the management and enforcement of policies related to the use of telecommunications services. It was conceived for use in connection with traditional telephone networks that carry voice, facsimile or voice-band-data (VBD) traffic, though it is not necessarily limited to such networks. It involves measurement of the properties of traffic on a communications channel, and the use of such knowledge in combination with various ancillary properties of telecommunications service usage to guide the conditional performance of prescribed actions based on user-defined policies. The measured traffic properties include classification of the type of traffic, where the set of possible classes include zero or more classes selected from a group of general categories comprising Voice, Facsimile, Voice-Band-Data, DTMF, Audible Network Signaling, Facsimile Handshaking, Voice-Band-Data Handshaking, Silence and Unknown. The ancillary properties may include network control parameters such as the apparent on-hook and off-hook state of the communications channel, the calling number, the called number, the side of the channel that originated the call, the side of the channel that is the dominant source of traffic for the call, the elapsed time since a call starts, and the time or day. The prescribed actions may include imposition of a recorded voice message, blockage of traffic on the communications channel, forced call termination through intervention with network signaling, direct notification of security personnel, generation of alarms, generation of call detail records, or other actions. The prescribed actions may also involve selecting or configuring a downstream telecommunications service for carriage of traffic with the observed traffic properties.

42 Claims, 2 Drawing Sheets

General Illustration of the Invention

Communications Channel

U.S. PATENT DOCUMENTS

| | | |
|---|---|---|
| 4,815,136 A | 3/1989 | Benvenuto et al. |
| 4,815,137 A | 3/1989 | Benvenuto et al. |
| 4,979,118 A | 12/1990 | Kheradpir |
| 5,253,247 A | 10/1993 | Hirose et al. |
| 5,353,346 A | 10/1994 | Cox et al. |
| 5,392,344 A | 2/1995 | Ash et al. |
| 5,442,696 A | 8/1995 | Lindberg et al. |
| 5,504,810 A | 4/1996 | McNair |
| 5,535,271 A | 7/1996 | Jangi et al. |
| 5,539,804 A | 7/1996 | Hong et al. |
| 5,606,604 A | 2/1997 | Rosenblatt et al. |
| 5,627,886 A | 5/1997 | Bowman |
| 5,768,354 A | 6/1998 | Lange et al. |
| 5,784,437 A | 7/1998 | Martinez et al. |
| 5,790,645 A | 8/1998 | Fawcett et al. |
| 5,818,916 A | 10/1998 | Vogl et al. |
| 6,249,575 B1 | 6/2001 | Heilmann et al. |
| 6,320,948 B1 | 11/2001 | Heilmann et al. |

Figure 1: General Illustration of the Invention

Figure 2: General Illustration of the Invention with Signaling Interface

Figure 3: Traffic Property Extractor Stage 1 of 2

Figure 4: Traffic Property Extractor Stage 2 of 2

APPARATUS AND METHOD FOR MANAGEMENT OF POLICIES ON THE USAGE OF TELECOMMUNICATIONS SERVICES

This is a continuation in part of Application Ser. No. 08/848431 filed May 8, 1997 now U.S. Pat. No. 5,949,864.

BACKGROUND

This invention enables end user enterprises to achieve specific objectives in the management and enforcement of policies related to the use of telecommunications services. It involves active measurement of the properties of traffic on a communications channel, and the use of such knowledge in strategic management of access to telecommunications services. It was conceived for use in connection with traditional telephone networks that carry voice, facsimile or voice-band-data (VBD) traffic, though it is not necessarily limited to such networks.

The term end user represents enterprises that make use of telecommunications services. Enterprises that act as an intermediary for access to telecommunications services are also considered to be end users.

Herein, the terms "facsimile" or "fax" represent Group 3 facsimile, which is a ubiquitous international standard for communicating facsimiles of documents over telephone networks. The term "voice-band-data" represents machine-generated information transported over a standard telecommunications voice channel. While facsimile is a form of voice-band-data, it is mentioned separately in this document to highlight the fact that it may be separately classified in the invention.

Voice-Band-Data traffic is usually generated by devices called modems. Correspondingly, the terms "voice-band-data traffic" and "modem traffic" are used interchangeably, and statements such as "the threat of modems" should be interpreted as the "threat of devices that facilitate the generation and communication of voice-band-data".

"Audible network signaling" signals are carried on traditional telephone networks that carry voice, facsimile or VBD. Such signals are intended to inform listeners about network status or to convey information to network terminal equipment. Dial tone and busy signal are examples of audible network signaling.

"Network Signaling" is a general term for the collection of protocols and procedures used for communication of control signals within a telecommunications network. There are two main classes of network signaling: channel associated signaling (CAS) and common channel signaling (CCS). CAS encompasses protocols and procedures where the signaling is passed over the same channel as is used to carry the service user's traffic. CCS encompasses protocols and procedures where the signaling and the service user's traffic do not share the same communications channel.

Dual-Tone Multi-Frequency (DTMF) signals represent the "dialed digits" of a phone number. DTMF signals are also used in some network signaling protocols to convey the calling number and called number to network terminal equipment. A typical example of the type of digital signal processing techniques that can be used for DTMF detection and classification can be found in U.S. Pat. No. 5,353,346.

End user enterprises have a need for placing restrictions on specific types of telecommunications service usage. For example, restrictions on the use of modems are needed to minimize the threat that unauthorized modems represent to computer security. Anyone using modems to dial in to a computer can gain relatively unfettered access to computer networks if the computer is connected to the network. The problem is that conventional data security measures, such as Internet firewalls, are bypassed by modems. A "hacker", i.e., any person seeking covert access to the computer network, will immediately resort to searching for modems once an Internet firewall is encountered.

Hackers are also aware that certain modems can be made to generate a "flash-hook" to the organization's private branch exchange (PBX). PBXs are essentially telephone network switches located at the customer's premises. Since about 1980 they have become commonplace in enterprises of more than about 50 people. This opens the door for the hacker to then dial another call (e.g. an overseas call), which originates from the enterprise, and as such is billed to the enterprise. A second example of the need for restricting telephone service usage is long-distance calling over fax machines. Without restrictions, employees can pick up the handset on the fax machine to originate unauthorized long distance calls. Finally, in some circumstances there is a need to restrict the number of lines occupied by VBD calls at a given time. This is useful for organizations such as universities, who face the risk of having their telecommunications facilities entirely consumed by VBD calls. People on campus can be stranded without the ability to call out even if there is an emergency.

Enterprises have a need for selecting from among a number of telecommunications service offerings based on the nature of the intended service usage. The telecommunications service offerings available to an enterprise may differ in terms of reliability, transmission delay, usage cost or other factors. The suitability of each such service offering depends on the nature of the intended usage. For example, interactive voice communication is noticeably degraded by transmission delays of as little as a few hundred milliseconds, whereas similar delays have no noticeable effect on facsimile or VBD. It is thus advantageous to use knowledge of the properties of the communications traffic in selection of the most suitable telecommunications service offering.

A device called the Faxcom device was described by Randall A. Law, Terrence W. Holm and Neil B. Cox in an article entitled "Real-Time Multi-Channel Monitoring of Communications on a T1 Span"; published in the Proceedings of the 1991 IEEE Pacific Rim Conference on Communications, Computers and Signal Processing at pages 306 to 309, and is incorporated herein by reference. This FaxCom device was deployed by telecommunications service providers across Canada in 1990 to support a reduced-rate facsimile-and-VBD-only service called FaxCom. The FaxCom device imposes a voice message and terminates the call when voice is detected. The FaxCom device has been demonstrated and sold to various international telecommunications service providers since 1990, and it has been offered as a vehicle for implementing class-based billing, where customers are billed differently based on whether their calls are voice, facsimile or voice-band-data. The present invention differs in that it terminates the call or otherwise blocks communication when "illegal" traffic is detected, where "illegal" may be Voice, Facsimile, VBD or any combination thereof. The Faxcom device is ineffective for modem blocking. Moreover, the Faxcom device is used by telecommunications service providers whereas the present invention is intended for telecommunications service users.

Co-pending U.S. patent application Ser. No. 08/848431, filed May 8, 1997 by a common inventor is herein incorporated by reference. This Patent Application describes embodiments for use by telecommunications service providers for control of certain types of telecommunications signaling fraud, and for policing of specialized service offerings. The present invention differs in that it empowers users of telecommunications services to detect and mitigate patterns of service utilization that are deemed to be undesirable. Components for classifying telephone signals are disclosed in other patents such as U.S. Pat. Nos. 5,539,804, 4,809,272, 4,815,137, 4,815,136 and 4,720,862. However, none disclose comparable combination of signal property measurement and service use control.

Therefore, there is a need for a system and method to actively measure the properties of telecommunications traffic for the purpose of managing policies on the selection and usage of telecommunications services within an enterprise. Specifically, there is a need for separate service access policies for Voice, Facsimile and Modems, and for actively performing the necessary monitoring and policing to ensure compliance with these policies. "Not-Modem" lines are needed to block usage of unauthorized modems, thereby mitigating the associated threat to computer security. "Modem-only" lines are needed to reduce the threat of long distance fraud through generation of a "flash-hook" from a modem: the call can be terminated as soon as the conversation starts. "Fax-only" lines prevent Fax machines from being used for unauthorized long distance calls. Finally, the categorization of traffic as voice, facsimile and modem allows for strategic selection of telecommunications services to best match the intended usage.

SUMMARY OF THE INVENTION

The present invention allows end user enterprises to achieve specific objectives in the management and enforcement of policies related to the use of telecommunications services in a telecommunications network. It was conceived for use in connection with traditional telephone networks that carry voice, facsimile or voice-band-data (VBD) traffic, though it is not necessarily limited to such networks. It involves active measurement of the properties of traffic on a communications channel, and the use of such knowledge in the conditional performance of prescribed actions based on the traffic properties. The measured traffic properties include classification of the type of traffic, where the set of possible classes include zero or more classes selected from a group of general categories comprising Voice, Facsimile, Voice-Band-Data, DTMF, Audible Network Signaling, Facsimile Handshaking, Voice-Band-Data Handshaking, Silence and Unknown. The prescribed actions may also be conditional on one or more items selected from the group of items comprising the apparent on-hook and off-hook state of each side of said communications channel, the calling number, the called number, the side of the channel that originated the call, the side of the channel that is the dominant source of traffic for the call, the elapsed time since a call starts, and the time of day. The prescribed actions have the effect of blocking usage of telecommunications service by traffic with specified properties under specified conditions. The prescribed actions can be disabled to make it operative for collection of data on the degree of compliance with service usage policies. The prescribed actions can also involve selecting or configuring a downstream telecommunications service for carriage of traffic with the observed traffic properties.

According to the invention there is a Traffic Property Extractor and a Policy Management Enactor which combine to conditionally manage and enforce policies on telecommunications service usage based on the observed properties of traffic on a communications channel. Preferred embodiments also include a Signaling Monitor to extract information from network signaling so as to increase the set of possible conditions that can be defined in the service usage policies. The acquisition of network signaling information and the enactment of the prescribed actions may involve an external device, depending on the structure of the telecommunications device and the needs of the application.

There is provided a phone service control platform for establishing separate policies for Voice, Facsimile and Modem traffic over an enterprise's telecommunications services, and for actively performing the necessary monitoring, policing and record generation to ensure compliance with these policies. The prescribed actions on detection of illegal activity may include imposition of a recorded voice message, blockage of traffic on the communications channel, forced call termination through intervention with network signaling, direct notification of security personnel or other actions.

The invention provides a superior means of minimizing the threat of unauthorized modems to computer security by blocking modem use on specified phone lines. The threat of long distance fraud through generation of a "flash-hook" from a modem can be mitigated by declaring all lines that are attached to authorized modems to be "modem-only" lines: Illegal voice calls can then be terminated as soon as the conversation starts. Declaration of all lines connected to fax machines to be "fax-only" lines serves to block the threat of unauthorized long distance calls through facsimile machines. Finally, the categorization of traffic as voice, facsimile and VBD allows for strategic selection of telecommunications services to best match the intended usage.

BRIEF DESCRIPTION OF THE DRAWINGS

The novel features believed characteristic of the invention are set forth in the appended claims. The invention itself, however, as well as other features and advantages thereof, will be best understood by reference to the description which follows, read in conjunction with the accompanying drawings wherein:

DETAILED DESCRIPTION WITH REFERENCE TO THE DRAWINGS

Figure 1:
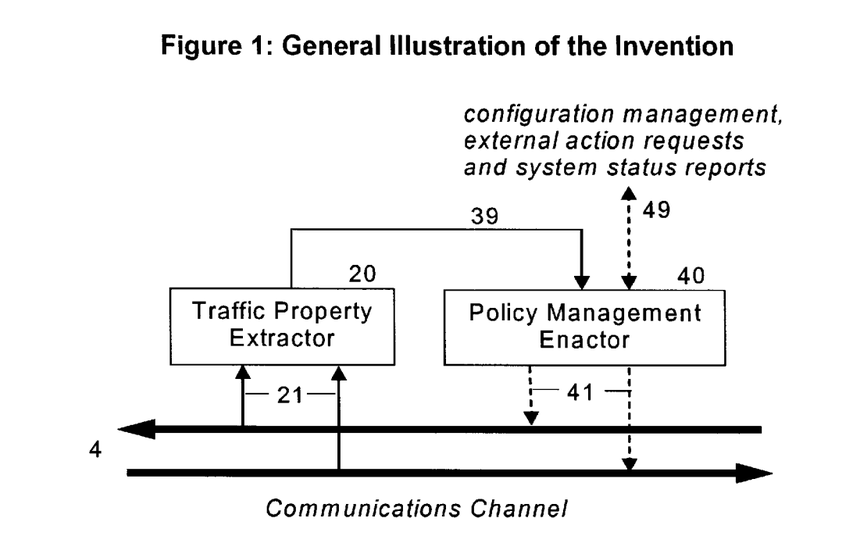
FIG. 1 is a general illustration of a representative embodiment of the invention.
Figure 2:
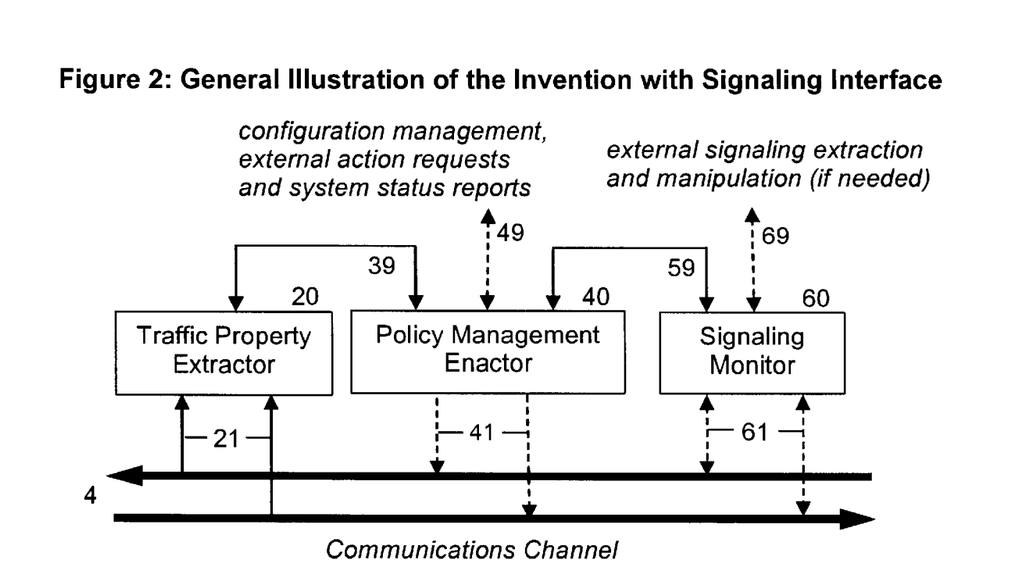
FIG. 2 is a general illustration of a representative embodiment of the invention with a Signaling Monitor included.

Referring to FIGS. 1 and 2 there are shown block diagrams of representative embodiments of the invention. Briefly, the Traffic Property Extractor 20 measures properties of the traffic on the Communications Channel 4; and the Policy Management Enactor 40 conditionally implements prescribed actions based on information from the Traffic Property Extractor 20. A Signaling Monitor 60 is included in some embodiments, such as illustrated in FIG. 2, when it is desired to access call-specific control information, such as determining when a call starts or stops, determining which side of the channel originates a call, or determining the calling and called phone number. An optional external device provides configuration control, such as setting of the type of prescribed actions in accordance with the predetermined preferences of the user. The external device also performs monitoring and data collection functions when needed to provide security personnel with an efficient and effective tool for detecting and mitigating fraudulent usage of telecommunications services. The external device may also supply signaling information or other control information when such information is not available from the components of the invention. Finally, the external device may participate in the performance of prescribed actions as directed by the invention.

Traffic Property Extractor 20

The Traffic Property Extractor 20 of FIGS. 1 and 2 produces an output Traffic Property Indicator over line 39 which characterizes the traffic on the Communications Channel 4 at any given point in time, taking into account the recent time course of signal characteristics. The Traffic Property Extractor 20 desirably has the following properties:

- It must be highly accurate, as its output is used to constrain the use of phone service. In particular, there must be a high level of certainty in any Voice, Facsimile or VBD classification. This implies the existence of one or more "Unknown" classes to accommodate ambiguous cases.
- Sustained Voice, Fax or VBD activity should be properly classified within a few seconds.
- All common variants and protocols for Fax and VBD should be accommodated.
- Normal variability in signal quality over telephone systems should not degrade the accuracy of the classifications. This includes noise, distortion, cross-talk and network echoes.
- A person should not be able to cause erroneous classifications through deliberate signal manipulation, while still carrying on useful communication.
- A Fax (or VBD) classification should not be determined solely from the observation of certain handshaking tones, as a person could then deceive the classifier simply by generating a short tone burst at the start of the call.
- The Traffic Property Extractor 20 should be active throughout a given call, otherwise the enforcement of usage policies is trivial to evade by simply waiting until the classifier is dormant.
- The set of signal classes output from the Traffic Property Extractor 20 depends on the application. This set typically includes zero or more classes from each of the following general categories: Voice, Facsimile, VBD, Audible Network Signaling, Facsimile Handshaking, VBD Handshaking, Silence, and Unknown. For some embodiments of the invention, the Traffic Property Extractor 20 also detects and classifies DTMF signals, and signals that occur between calls on a communications channel.

The Traffic Property Extractor 20 typically performs a two-stage process, where the first stage involves derivation of two signal property vectors, one for each side of the communications channel, and the second stage involves generation of the output Traffic Property Indicator over line 39 based on the time course of the two signal property vectors.

Figure 3:
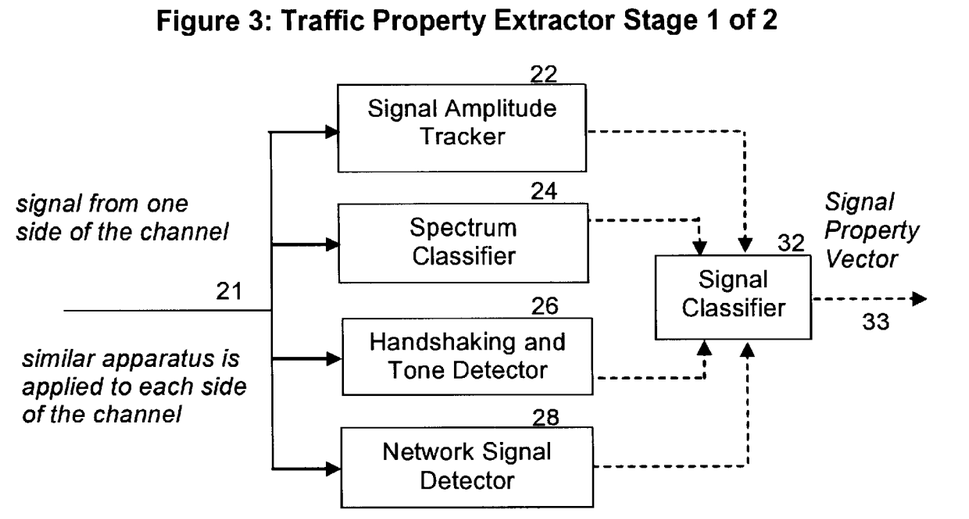
FIG. 3 illustrates an embodiment of the first stage in the Traffic Property Extractor of the invention.

Referring to FIG. 3 there is a block diagram of an embodiment of the first stage of the Traffic Property Extractor 20. The input 21 is the signal from one side of the Communications Channel 4. The output Signal Property Vector 33 is an indication of the type of signal on input 21. An identical apparatus is applied for each side of the channel.

The Amplitude Tracker 22 measures the time course of signal amplitudes on Communications Channel 4. This is useful for detecting silence, differentiating voice from fax and VBD, and determining which side of the channel is the dominant source of signal. The Spectrum Classifier 24 estimates the most likely signal class based on the local spectral characteristics. The Handshaking and Tone Detector 26 detects and classifies a number of standard facsimile and VBD handshaking signals, and depending on the application may also detect and classify the Dual-Tone Multi-Frequency (DTMF) signals used to represent dialed digits of phone numbers. The Network Signal Detector 28 is needed for some applications to detect the various audible network signaling signals that occur in telephone networks. While audible network signaling usually occurs between calls in a network, it can also be generated during an active call by answering machines, PBXs and other terminal devices. Finally, the Signal Classifier 32 determines the output Signal Property Vector 33 based on information gathered from the time course of the outputs of the Amplitude Tracker 22, the Spectrum Classifier 24, the Handshaking and Tone Detector 26, and the Network Signal Detector 28.

The Spectrum Classifier 24 generally includes a slowly-adapted line-length compensation filter to compensate for the high-frequency attenuation caused by long communication lines. Such line length compensation may also be needed within the Handshaking and Tone Detector 26 and the Network Signal Detector 28, depending on the techniques used for detection.

Figure 4:
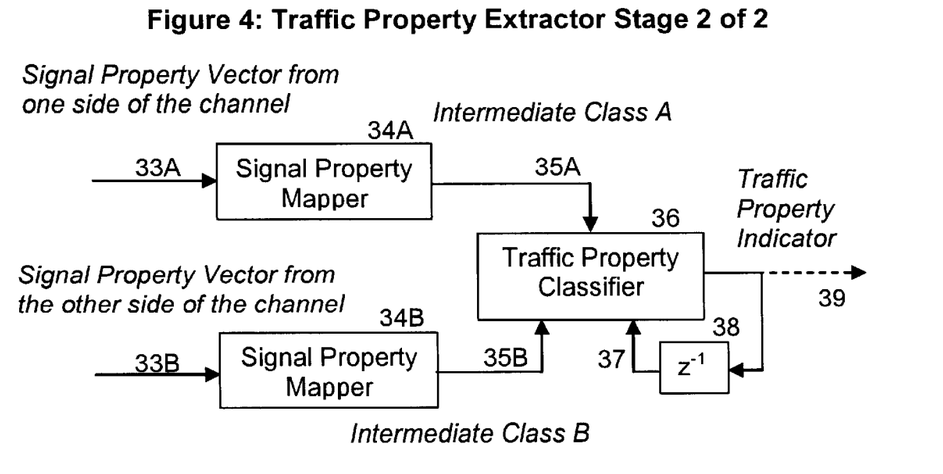
FIG. 4 illustrates an embodiment of the second stage in the Traffic Property Extractor of the invention.

Referring to FIG. 4 there is a block diagram of an embodiment of the second stage of the Traffic Property Extractor 20. The inputs 33A and 33B are signal property vectors, one from each side of the Communications Channel 4, such as are derived in the first stage of the Traffic Property Extractor 20. The input signal property vectors 34A and 34B are mapped onto a set of intermediate classes 35A and 35B, which are then used within the Traffic Property Classifier 36 in combination with preceding values of the Traffic Property Indicator 37 to update the output Traffic Property Indicator on line 39. The preceding values of the Traffic Property Indicator 37 are obtained by passing the output Traffic Property Indicator on line 39 through Delay Element 38. The set of intermediate classes conveyed over lines 35A and 35B of FIG. 4, and the set of traffic property indicators output on line 39, depend on what is required in the Policy Management Enactor 40 to meet the needs of the application. These sets typically include zero or more classes from each of the following general categories: Voice, Facsimile, VBD, Audible Network Signaling, DTMF, Facsimile Handshaking, VBD Handshaking, Silence, and Unknown.

In order to configure the Signal Property Mappers 34A and 34B of FIG. 4 for a particular application, it is necessary to define tables for mapping of signal property vectors onto intermediate classes. It is also necessary to define a table in the Traffic Property Classifier 36 for updating the output Traffic Property Indicator on line 39 based on the Intermediate Classes 35A and 35B and preceding values of the Traffic Property Indicator 37. Certain applications also require that these mapping processes be dynamically altered when certain signal properties are observed. For example, this provides a mechanism for allowing handshaking early in the call to influence traffic classifications throughout the remainder of the call.

Some embodiments of the Traffic Property Extractor 20 generate additional traffic properties for output on line 39. This may include an indication of the size of the signal or an indication of which end of the Communications Channel 4 is generating traffic at a given point in time. This is generally achieved by reference to the signal amplitude on each side of the communications channel, such as is measured by the Amplitude Trackers 22. One can use this amplitude information, combined with prior knowledge of standard Fax and VBD handshaking procedures, to further infer which side of the channel originated a Fax or VBD call. This is particularly useful when network signaling does not provide such information. Note that one can not assume that signals on a given side of a communications channel were generated on that side, as cross-talk and echoes can cause significant leakage from one side to another.

Policy Management Enactor 40

The Policy Management Enactor 40 of FIG. 1 causes conditional performance of prescribed actions based on the Traffic Property Indicator on line 39 and the Policy Management Enactor Control Line 49. The Policy Management Enactor 40 is configured to perform the prescribed actions when specified combinations of traffic properties occur, or when different specified combinations of traffic properties fail to occur within a specified period of time after the start of a call. The Policy Management Enactor 40 may additionally include conditions that are unrelated to the traffic properties such as the time of day. These specified combinations may change as a consequence of the passage of time or the observance of different specific combinations of traffic properties.

As illustrated in FIG. 2, some embodiments of the Policy Management Enactor 40 also take a input from a Signaling Monitor 60 through line 59, and pass this input on to the Traffic Property Extractor 20 through line 39. The Policy Management Enactor 40 may then additionally include conditions that are related to the properties of a call, such as the elapsed time since the start of the call, the calling number, the called number, and the side of the channel that originates the call. The Traffic Property Extractor 20 may also then refine its traffic property indications in the context of signaling information.

Some embodiments of the Policy Management Enactor 40 include timers that are started (or stopped) when the Traffic Property Indicator on line 39 changes. This allows prescribed actions to be triggered when given traffic properties remain unaltered for a specified period of time. Other applications may require maintenance of running tallies of the time spent in each traffic property, or records of the sequence of observed traffic properties.

The prescribed actions may involve imposition of a recorded voice message, blockage of traffic on the communications channel, forced call termination through intervention with network signaling, direct notification of security personnel or other actions. The manner of implementing such actions within the Policy Management Enactor 40 may comprise altering the signal on the Communications Channel 4 (lines 41) or sending of requests for action to an external device via line 49. Such actions may also be implemented by sending of requests for action to the Signaling Monitor 60 through line 59, as illustrated in FIG. 2.

Some embodiments of Policy Management Enactor 40 also include mechanisms for disabling the prescribed actions as part of the configuration control provided through line 49. The Policy Management Enactor 40 is then operative for collection of data on compliance with usage policies rather than as an enforcer of usage restrictions.

An embodiment of Policy Management Enactor 40 is implemented by mapping the Traffic Property Indicator on line 39 onto a set of generic categories such as "Good", "Maybe", "Bad" and "Silence", as well as two special categories called "Ignore" and "Freeze". The prescribed actions are not performed when "Good" traffic is observed. The prescribed actions are performed when "Bad" traffic is observed. The "Maybe" category is equivalent to either "Good" or "Bad", depending on the configuration. The "Silence" category may or may not elicit actions, depending on the requirements of the application. Occurrences of the "Ignore" category have no effect on the actions of the Policy Management Enactor 40. Occurrences of the "Freeze" category result in temporary disabling of the actions of the Policy Management Enactor 40, i.e., prescribed actions that would normally be performed on the occurrence of certain conditions are deferred until the system is released from its frozen state.

The above embodiment of Policy Management Enactor 40 uses input from the Signaling Monitor obtained through line 59 to switch among various predefined options for mapping the Traffic Property Indicator on line 39 onto the generic categories. Such switching of the mapping may also be implemented under control of configuration information from an external device (line 49).

Signaling Monitor 60

The Signaling Monitor 60 of FIG. 2 extracts information about call activity on Communications Channel 4, and communicates this information to the Policy Management Enactor 40 through line 59 as needed. This generally includes hook-state indications, which are indications of when either side of Communications Channel 4 enter an on-hook state or an off-hook state. The hook-state of the channel may be determined from signaling information within the Communications Channel 4 (lines 61), or from a separate signaling source (line 69), depending on the signaling conventions used in connection with the telephone network. In particular, lines 61 are used for networks operated in accordance with what is called Channel Associated Signaling (CAS) protocols, and line 69 is used for networks operating in accordance with what is called Common Channel Signaling (CCS) protocols.

The Signaling Monitor 60 may extract additional information from the network signaling when such information is useful in refining the service usage policy. For example, the Signaling Monitor 60 may derive the calling number and the called number so that policies can be based on who is calling whom. The Signaling Monitor 60 may acquire such information either from an external device (line 69) or from the Traffic Property Extractor 20 via the Policy Management Enactor 40 (line 59), depending on how such information is carried in the network signaling.

The Signaling Monitor 60 may implement signaling manipulation actions under the direction of the Policy Management Enactor 40 through line 59 by modifying signaling on Communications Channel 4 (lines 61). The Signaling Monitor 60 may alternatively pass such signaling manipulation requests on to an external device via line 69.

External Functions

An external device can be connected as needed to line 49 of FIG. 1 and lines 49 and 69 of FIG. 2 in order to provides an interface with the communication systems management entities of an enterprise. The external device can coordinate configuration control, report alarms, detect failures, and execute periodic system integrity checks. Such an external device also provides the capacity to generate periodic reports about the properties of traffic on the communications channel, and about instances when the invention detects violations of prescribed service usage policies. Such periodic reports are used for identification and education of personnel within an enterprise that seek to violate service usage policies. Such periodic reports are also useful for periodic verification of system integrity and operational status.

An external device generally provides the capability to generate call detail records (CDRs). Such records summarize the properties of the call, including whether or not "illegal" traffic properties were detected, and whether the performance of prescribed actions was required. CDRs may be stored within the external device or communicated to another external device for storage.

An external device may simultaneously provide system control functions for a number of instances of the invention. Similarly, a given external device may interact with other such devices for the purpose of efficient coordination of the configuration, and collective management of the operation, of a number of instances of the invention.

The external device may interact with other entities within the enterprise's communications network for acquisition of information that is not available within the invention, or to convey information to external system management entities within the enterprise. For example, interaction with PBXs may be needed to acquire information about the extension used for outgoing calls, and interaction with enterprise management software may be needed for centralized remote management of configuration settings for the invention.

An Embodiment for Use as a Phone Service Control Platform

An embodiment of the invention dedicated for use as a phone service control platform within an end user enterprise is herein referred to as a Phone Firewall, or Phonewall. "Phone Firewall" and "Phonewall" are Trademarks of Sentry Telecom Systems, Inc. This embodiment allows phone lines for an enterprise to implement separate service access policies for voice, fax, and modem traffic, and actively performs the necessary monitoring, policing and record generation to ensure compliance with these policies. Referring to the block diagrams in FIGS. 1 and 2, the various components of the invention perform the following functions:

1. The Traffic Property Extractor 20 determines which of 34 classes of traffic is present on the channel at a given point in time, including Voice, Facsimile, High-bit-rate VBD, Low-bit-rate VBD, Silence, Unknown, Eleven classes of Tones, Fax Handshaking or Modem Handshaking, Audible Network Signaling and sixteen classes of DTMF signals. A 35th class, called the "Uncertain" class, is also defined to allow for startup conditions or other conditions where there is insufficient data to make a classification. The classifier will either stay in the current class or switch to the Unknown class until such time that a given new class is detected with a high degree of certainty. The delay between the onset of a given type of signal and the generation of a classification varies from a few hundred milliseconds to several seconds, depending on the class. Accuracy is more important than fast detection in this application. The Traffic Property Extractor 20 also measures the size of the signal on the channel and provides an indication of which end of the channel is the dominant source of traffic. The processing for the Traffic Property Extractor 20 is consistent with FIGS. 3 and 4, and descriptions thereof. The specific processing for DTMF detection is consistent with the disclosure of U.S. Pat. No. 5,353,346.

2. The Policy Management Enactor 40 waits for a configurable "grace period" after the start of a call, during which all traffic is allowed to pass. The grace period is useful because the set up of legitimate facsimile calls can involve voice interaction. After expiry of the grace period, the Policy Management Enactor 40 conditionally applies service usage restrictions in accordance with predetermined configuration settings. The structure of Policy Management Enactor 40 is consistent with the earlier description, where input from the Traffic Property Indicator on line 39 is mapped onto a set of generic categories dubbed "Good", "Bad", "Maybe", "Silence", "Ignore" and "Freeze". Separate regimen for service usage are established by substituting separate mappings. Restrictions are imposed when the "Bad" category is observed, or under some configurations when the "Maybe" category is observed. Both sides of the channel are forced to an on-hook state when such signals are detected, thereby causing switches in the network to terminate the call. For networks operated in accordance with channel associated signaling (CAS) protocols, the hook-state forcing functions are implemented by altering signaling information carried within the communications channel, i.e., lines 61 in FIG. 2. For networks operating in accordance with Common Channel Signaling (CCS) protocols, the hook-state forcing functions are implemented by requesting that an external device trigger the generation of signaling messages over a separate signaling channel, i.e., line 69 in FIG. 2. The Policy Management Enactor 40 can perform traffic manipulation functions, such as blockage or imposition of a voice message, if needed.

3. The Signaling Monitor 60 activates the Policy Management Enactor 40 when both sides of a channel are off-hook, and deactivates it at other times. The Signaling Monitor 60 also extracts additional information from the signaling when possible, including the calling number, the called number and the side of the channel that originated the call. This additional information is relayed to the Policy Management Enactor 40 for subsequent use in activating the appropriate configuration of the Policy Management Enactor 40 for the call. The additional information is relayed directly to the Policy Management Enactor 40 through line 59, or indirectly through an external device via lines 69 and 49.

4. An external device supports a call blocking administration database, allowing administrators to specify conditional blockage of voice, facsimile, modems or any combination thereof. Separate blockage conditions can be established for specified calling numbers and called numbers when they are available from the signaling. Activation and deactivation schedules for blockage can be specified. For example, one can specify that only modem calls are allowed between two specified phone numbers from 9 am to 5 pm, and only voice calls are allowed at other times.

A Call Detail Record (CDR) is generated by the external device at the end of each call based on information acquired from the Traffic Property Extractor 20, the Policy Management Enactor 40 and the Signaling Monitor 60. The external device also terminates calls at the request of the Policy Management Enactor 40 by triggering generation of signaling commands when the Communications Channel 4 is from a network controlled by common-channel signaling (CCS). Finally, provisions are made for the external device to communicate with other external entities to provide centralized configuration management and off-line CDR storage and analysis.

The Signal Property Extractor 20 and the Policy Management Enactor 40 of this embodiment are designed to support the circumstance where the Signaling Monitor 60 is omitted, as illustrated in FIG. 1. While such an embodiment is limited with regards to the range of features and configuration options that can be implemented, it nonetheless can provide a sufficient basis for establishing separate access policies for voice, facsimile or modems. The Policy Management Enactor 40 functions through lines 41 by briefly blocking the Communications Channel 4 when "illegal" traffic is detected. Such blockages quickly cause facsimile and modem equipment to terminate the call. For cases where Voice traffic is being blocked, the duration of the blockage is made to be longer and the blockage is made to rapidly reoccur if the person tries to simply wait through the blockage. The channel is thus rendered useless for Voice communication when desired. The external device generates an "intervention record" in the same format as a CDR anytime that the Policy Management Enactor 40 acts to block the channel.

While this invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of embodiments as fall within the true scope of the invention.

We claim:

1. An apparatus for management of policies related to usage of telecommunications services of a telecommunications network, wherein said policies depend on properties of traffic on a communications channel, said apparatus comprising:
   (a) a traffic property extractor coupled to said communications channel and operative to measure said properties of traffic on said communications channel, and
   (b) a policy management enactor coupled to said traffic property extractor and to said communications channel and operative for conditional performance of prescribed actions, said conditional performance being based on said traffic properties.

2. An apparatus according to claim 1 wherein said apparatus is employed by an end user of said telecommunications services.

3. An apparatus according to claim 1 wherein said communications channel is a ubiquitous channel for carrying voice, facsimile or voice-band-data traffic.

4. An apparatus according to claim 1 wherein said properties of traffic comprise classifications of types of traffic present on said communications channel, and said apparatus is configured to select zero or more classes from a group of general categories comprising voice, facsimile, voice-band-data, DTMF, audible network signaling, facsimile handshaking, voice-band-data handshaking, silence, and unknown.

5. An apparatus according to claim 1 wherein said prescribed actions are conditional on one or more items selected from the group of items consisting of: apparent on-hook and off-hook states of each side of said communications channel, a calling number, a called number, a side of the channel that originated a call, a side of the channel that is a dominant source of traffic for a call, an elapsed time since a call start, and a time of day.

6. An apparatus according to claim 1 wherein said prescribed actions can be disabled and said apparatus made operative for collection of data on a degree of compliance with said policies related to the usage of telecommunications services.

7. An apparatus according to claim 1 wherein said traffic property extractor comprises:
   a first stage which measures properties of a signal on each side of said communications channel to provide one or more derived signal property vectors; and
   a second stage having respective inputs thereto coupled to outputs from said first stage and providing an output traffic property indicator based on said derived signal property vectors for each side of said communications channel.

8. An apparatus according to claim 7 wherein said derived signal property vectors and said output traffic property indicator each comprise classes selected from a group consisting of: voice, facsimile, voice-band-data, DTMF, audible network signaling, facsimile handshaking, voice band-data handshaking, silence and unknown.

9. An apparatus according to claim 7 wherein said first stage has two signal property analysis devices, one coupled to each side of said communications channel, each of said signal property analysis devices comprising:
   (a) a spectrum classifier coupled to a corresponding side of said communications channel and operative to determine a likely signal classification based on an analysis of a spectrum of the signal;
   (b) a handshaking and tone detector coupled to a corresponding side of said communications channel and operative to detect tones and handshaking signals of telecommunications network traffic;
   (c) a signal amplitude tracker coupled to a corresponding side of said communications channel and operative to track an amplitude of the signal; and,
   (d) a signal classifier coupled to said spectrum classifier, to said signal amplitude tracker and to said handshaking and tone detector and operative to produce a derived signal property vector.

10. An apparatus according to claim 9, wherein said handshaking and tone detector is operative to supply said signal classifier with indications of the presence and type of voice-band-data or facsimile handshaking signals, wherein said indications are considered in said signal classifier in producing said derived signal property vector.

11. An apparatus according to claim 9, wherein said handshaking and tone detector is operative to supply said signal classifier with indications of the presence and type of DTMF signals, wherein said indications are considered in said signal classifier in producing said derived signal property vector.

12. An apparatus according to claim 9, wherein said first stage additionally comprises a network signal detector having an input coupled to a corresponding side of said communications channel and an output coupled to said signal classifier, said network signal detector operative to supply said signal classifier with indications of the presence and type of audible network signaling, wherein said indications are considered in said signal classifier in producing said derived signal property vector.

13. An apparatus according to claim 9, wherein said first stage additionally comprises a network signal detector having an input coupled to a corresponding side of said communications channel and an output coupled to said signal classifier, said network signal detector operative to supply said signal classifier with indications of the presence and type of signals that occur between calls on a communications channel, wherein said indications are considered in said signal classifier in producing said derived signal property vector.

14. An apparatus according to claim 7 wherein said second stage comprises:
(a) a pair of signal property mapping devices coupled to respective outputs of said signal property analysis devices and operative to derive a pair of intermediate classifications; and
(b) a traffic property classifier coupled to an output of each of said signal property mapping devices and operative to determine said output traffic property indicator based on said intermediate classifications and prior samples of said output traffic property indicator.

15. An apparatus according to claim 14 wherein said signal property mapping devices are modified in response to the presence of predetermined signal properties.

16. An apparatus according to claim 1 wherein said traffic property extractor is operative to supply said policy management enactor with indications of which end of said communications channel is a dominant source of traffic, where said indications are considered in said policy management enactor in determining whether said policies related to usage of telecommunications services are being violated.

17. An apparatus according to claim 1 wherein said policy management enactor performs said prescribed actions on said communications channel when specified combinations of said traffic properties occur, and when different specified combinations of said traffic properties fail to occur within a specified period of time.

18. An apparatus according to claim 17 wherein said specified combinations are modified as a consequence of the passage of time or in response to combinations of traffic properties on said communications channel.

19. An apparatus according to claim 17 wherein said prescribed actions of said policy management enactor comprise imposition of a voice message on said communications channel.

20. An apparatus according to claim 17 wherein said prescribed actions comprise causing signaling for said communications channel to be forced to an on-hook state.

21. An apparatus according to claim 17 wherein said prescribed actions of said policy management enactor comprise temporary manipulation of signals on said communications channel such that communication is disrupted.

22. An apparatus according to claim 1, wherein said policy management enactor is additionally coupled to an external device, said external device operative for enacting said prescribed actions on behalf of said policy management enactor.

23. An apparatus according to claim 1, wherein said apparatus for management of policies comprises a signaling monitor coupled to said communications channel and to said policy management enactor and operative to supply said policy management enactor with indications of a state of signaling for said communications channel, where said indications are used in said policy management enactor to conditionally configure said prescribed actions.

24. An apparatus according to claim 23 wherein said signaling monitor extracts said indications of the state of signaling from control signals received over said telecommunications network.

25. An apparatus according to claim 23 wherein said Signaling Monitor is additionally coupled to an external device, said external device operative to supply said signaling monitor with said indications of the state of signaling.

26. An apparatus according to claim 23 wherein said indications of the state of signaling comprise indications of a call, said indications of a call being one or more items selected from the group of items consisting of: apparent on-hook and off hook states of each side of said communications channel, a calling number, a called number and a side of the channel that originated the call.

27. An apparatus according to claim 23 wherein said policy management enactor relays said indications of the state of signaling to said traffic property extractor, wherein said indications of the state of signaling are used to refine said measurements of said properties of traffic.

28. An apparatus according to claim 1, wherein said apparatus for management of policies comprises a signaling monitor coupled to said communications channel and to said policy management enactor, said signaling monitor operative to participate in said prescribed actions by causing modification of signaling associated with calls on said communications channel.

29. An apparatus according to claim 28 wherein said modification of the signaling comprises forcing the signaling to an on-hook state.

30. An apparatus according to claim 28 wherein said signaling monitor is coupled with an external device, said external device operative to assist said signaling monitor in said modification of the signaling.

31. An apparatus according to claim 1 wherein said apparatus for management of policies is coupled to an external device, wherein said external device is operative for performance of one or more functions selected from a group of functions consisting of: coordination of system configuration, reporting of alarms, detection of system failures, execution of periodic system integrity checks, gathering and storage of reports on said properties of traffic on said communications channel, and gathering and storage of reports on instances when said prescribed actions are activated.

32. An apparatus according to claim 1 wherein said apparatus for management of policies is coupled to an external device, wherein said external device is operative for selecting or configuring a downstream telecommunications service based on said properties of traffic.

33. An apparatus according to claim 1 wherein said prescribed actions have the effect of blocking said usage of telecommunications services when:
(a) network signaling indicates that both sides of said communications channel are in an off-hook state;
(b) a specified period of grace has elapsed since both sides of said communications channel went off-hook; and
(c) said properties of traffic observed on said communications channel are not consistent with a predetermined set of traffic properties that the telecommunications service user wishes to allow on said communications channel.

34. A method for managing and enforcing policies related to the use of services over a telecommunications network having network controlling devices and a communications channel so as to conditionally perform prescribed actions based upon properties of traffic on a communications channel, the method comprising:
(a) measuring properties of traffic on said communications channel,
(b) conditionally performing prescribed actions based upon said traffic properties.

35. A method according to claim 34, wherein said managing and enforcing are performed by an end user of said telecommunications network.

36. A method according to claim 34, comprising modifying said prescribed actions in response to information derived from network signaling.

37. A method according to claim 36 wherein said information derived from network signaling comprises one or more items selected from the group of items consisting of: apparent on-hook and off-hook states of each side of said communications channel, a calling number, a called number, a side of the channel that originated a call, a side of the channel that is a dominant source of traffic for the call, an elapsed time since a call commenced, and a time of day.

38. A method according to claim 34, comprising analyzing a signal on each side of said communications channel to provide a derived signal property vector and generating an output traffic property indicator based upon said derived signal property vectors.

39. A method according to claim 34, wherein said measuring step comprises:
(a) analyzing spectral characteristics of a signal on said communications channel and determining a likely signal classification from the spectral characteristics;
(b) detecting tones and handshaking signals of telecommunications network traffic;
(c) tracking an amplitude of the signal; and
(d) deriving an output signal property vector based on the results of steps (a), (b) and (c).

40. A method according to claim 34, wherein said prescribed actions comprise conditionally blocking said usage of telecommunications services based on said properties of traffic.

41. A method according to claim 34, wherein said prescribed actions comprise conditionally selecting or configuring a downstream telecommunications service based on said properties of traffic.

42. A method according to claim 34, wherein said communications channel is a ubiquitous one for carrying voice, facsimile and voice-band-data traffic.

* * * * *